United States Patent
Mabu et al.

(10) Patent No.: US 11,190,087 B2
(45) Date of Patent: Nov. 30, 2021

(54) METHOD FOR MANUFACTURING A LAMINATED IRON CORE

(71) Applicant: MITSUI HIGH-TEC, INC., Kitakyushu (JP)

(72) Inventors: Hirotoshi Mabu, Fukuoka (JP); Hidemi Sasaki, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 70 days.

(21) Appl. No.: 16/733,793

(22) Filed: Jan. 3, 2020

(65) Prior Publication Data

US 2020/0144899 A1 May 7, 2020

Related U.S. Application Data

(63) Continuation of application No. 15/236,617, filed on Aug. 15, 2016, now Pat. No. 10,560,005.

(30) Foreign Application Priority Data

Aug. 17, 2015 (JP) .................. 2015-160417

(51) Int. Cl.
*H02K 15/00* (2006.01)
*H02K 15/03* (2006.01)
*H01F 41/02* (2006.01)

(52) U.S. Cl.
CPC ......... *H02K 15/03* (2013.01); *H01F 41/0233* (2013.01); *Y10T 29/49009* (2015.01); *Y10T 29/53143* (2015.01)

(58) Field of Classification Search
CPC ........ H02K 15/03; H02K 15/12; H02K 1/276; H02K 1/18; Y10T 29/49012;

(Continued)

(56) References Cited

U.S. PATENT DOCUMENTS 7,960,885 B2   6/2011  Mizutani et al.
9,455,612 B2 *  9/2016  Hirayama .............. H02K 15/03
(Continued)

FOREIGN PATENT DOCUMENTS

CN    101657950    2/2010
CN    103730993    4/2014
(Continued)

OTHER PUBLICATIONS

Office Action issued in China Counterpart Patent Appl. No. 201610675738.7, dated Sep. 26, 2018 , along with an English translation thereof.

(Continued)

*Primary Examiner* — Thiem D Phan
(74) *Attorney, Agent, or Firm* — Greenblum & Bernstein, P.L.C.

(57) ABSTRACT

A method for manufacturing a laminated iron core including placing a laminated iron core body on a conveyance jig. Downwardly moving the conveyance jig by a lift and downwardly moving an upper die with respect to a lower die of the die unit. The lift being mounted so as to be unaffixed to both the die unit and the conveyance jig. Holding the laminated iron core body placed on the conveyance jig from both sides in a lamination direction of the plurality of iron core pieces between the lower die and the upper die, the lower die coming into contact with the conveyance jig. Injecting a resin into a through hole formed through the laminated iron core body held by the die unit in the lamination direction of the plurality of iron core pieces from the lower die through the conveyance jig or from the upper die.

6 Claims, 3 Drawing Sheets

(58) Field of Classification Search
CPC ........ Y10T 29/49009; Y10T 29/53143; H05K 2203/1316; H05K 3/284
USPC .......... 29/596, 598, 607, 609, 721, 732, 738
See application file for complete search history.

(56) References Cited

U.S. PATENT DOCUMENTS

| | | |
|---|---|---|
| 9,947,464 B2 * | 4/2018 | Nagai .................... H02K 15/03 |
| 2010/0026127 A1 | 2/2010 | Mizutani et al. |
| 2014/0103574 A1 | 4/2014 | Ishimatsu |
| 2015/0054196 A1 | 2/2015 | Ishimatsu et al. |

FOREIGN PATENT DOCUMENTS

| | | |
|---|---|---|
| JP | 2006-211748 A | 8/2006 |
| JP | 2011-016276 | 1/2011 |
| JP | 2012-10595 | 1/2012 |
| JP | 2013-215058 | 10/2013 |
| JP | 5486574 | 5/2014 |
| JP | 2015-126671 | 7/2015 |

OTHER PUBLICATIONS

Office Action issued in Japan Counterpart Patent Appl. No. 2015-160417, dated Mar. 26, 2019, along with an English translation thereof.

* cited by examiner

FIG.2 --Prior Art--

METHOD FOR MANUFACTURING A LAMINATED IRON CORE

CROSS REFERENCE TO RELATED APPLICATION(S)

This is a continuation application of pending U.S. application Ser. No. 15/236,617, filed Aug. 15, 2016, which claims priority of Japanese Patent Application No. 2015-160417, filed on Aug. 17, 2015, the contents of each are incorporated herein by reference in its entirety.

BACKGROUND OF THE INVENTION

1. Field of the Invention

The present invention relates to an apparatus for manufacturing a laminated iron core, in which a resin is injected into a through hole of a laminated iron core body in which a plurality of iron core pieces are laminated.

2. Description of the Related Art

For example, JP-A-2013-215058 as Patent Reference 1 discloses an apparatus for manufacturing a laminated iron core, in which a permanent magnet inserted into a magnet-insert hole of a laminated iron core body is fixed by a resin.

Concretely, as shown in FIG. 2, an apparatus 80 for manufacturing a laminated iron core includes a die unit 83 having a lower die 81 for injecting a resin and an upwardly and downwardly movable upper die 82 and this upper die 82 is provided with a guide rail unit 84. In use, after a conveyance jig 85 on which a laminated iron core body 86 is placed is slid and attached to the guide rail unit 84, the conveyance jig 85 is attached to the lower die 81 with downward movement of the upper die 82, and the laminated iron core body 86 is held by the upper die 82 and the lower die 81, and the resin is injected.

The laminated iron core bodies 86 may have the same shape in plan view but have different lamination heights (or core thicknesses). In this case, it is necessary to match a height position of the guide rail unit 84 with the lamination height of the laminated iron core bodies 86 although the die unit 83 can be used in common.

Hence, a spacer 87 is arranged between the upper die 82 and the guide rail unit 84, and this spacer 87 is replaced according to the lamination height of the laminated iron core bodies 86 to thereby adjust a position relation between the upper die 82 and the laminated iron core bodies 86.

Patent Reference 1: JP-A-2013-215058

SUMMARY OF THE INVENTION

However, the apparatus 80 in the related art for manufacturing the laminated iron core has the following problems to be solved still.

Since the inside space of the manufacturing apparatus is small, it is difficult to do work at the time of replacing the spacer (a hand may be put in a gap of the manufacturing apparatus to do work).

Also, for production of the laminated iron core (in order to increase production efficiency), a worker may replace the spacer in an insufficient cooling state of the die unit to suffer burns.

Further, in the case of manufacturing the laminated iron core with a lamination height different from a normal lamination height, for example, a prototype, it is necessary to make a new spacer which is not economical.

The present invention has been implemented in view of such circumstances, and a non-limited object of the present invention is to provide an apparatus for manufacturing a laminated iron core, capable of manufacturing the laminated iron cores with different lamination heights economically with high workability without decreasing productivity.

An aspect of the present invention provides an apparatus for manufacturing a laminated iron core, the apparatus including: a conveyance jig on which a laminated iron core body is placed, wherein the laminated iron core body is the lamination of a plurality of iron core pieces; a die unit including a lower die and an upper die upwardly and downwardly movable with respect to the lower die, which holds the laminated iron core body placed on the conveyance jig from both sides in a lamination direction of the plurality of iron core pieces between the lower die and the upper die; an injector injecting a resin into a through hole formed through the laminated iron core body held by the die unit in the lamination direction of the plurality of iron core pieces from the lower die through the conveyance jig or from the upper die; and an upward and downward movement unit capable of upwardly and downwardly moving the conveyance jig with respect to the lower die, wherein the upward and downward movement unit is provided independently from the die unit.

The apparatus for manufacturing the laminated iron core may be configured such that the through hole is a magnet-insert hole, and the injector injects the resin into the magnet-insert hole to thereby fix a permanent magnet to the magnet-insert hole.

The apparatus for manufacturing the laminated iron core may be configured such that the upward and downward movement unit is provided separately in position from the die unit.

The apparatus for manufacturing the laminated iron core may be configured such that the conveyance jig has a quadrilateral shape in plan view, and the upward and downward movement unit includes a pair of upwardly and downwardly movable support parts for supporting the conveyance jig from both sides in a width direction, each of the support parts being provided with a guide groove in which the conveyance jig is slidably attached to be horizontally moved and arranged between the lower die and the upper die.

The apparatus for manufacturing the laminated iron core may be configured such that the upward and downward movement unit further includes a pair of guide posts which moves the support parts upwardly and downwardly.

The apparatus for manufacturing the laminated iron core may be configured by further including a controller which controls the upper die and the upward and downward movement unit to cooperate an operation of the upward and downward movement unit with an operation of the upper die.

In the apparatus for manufacturing the laminated iron core according to the aspect of the present invention, the upward and downward movement unit capable of upwardly and downwardly moving the conveyance jig with respect to the lower die is formed independently from the die unit, with the result that it becomes unnecessary to use a spacer like a manufacturing apparatus as in the related art. Accordingly, the laminated iron cores with different lamination heights can be manufactured economically with high workability without decreasing productivity.

DETAILED DESCRIPTION OF THE EXEMPLARY EMBODIMENTS

Subsequently, an embodiment embodying the aspect of the present invention will be described with reference to the accompanying drawings, and the essence of the present invention will be understood.

Figure 1:
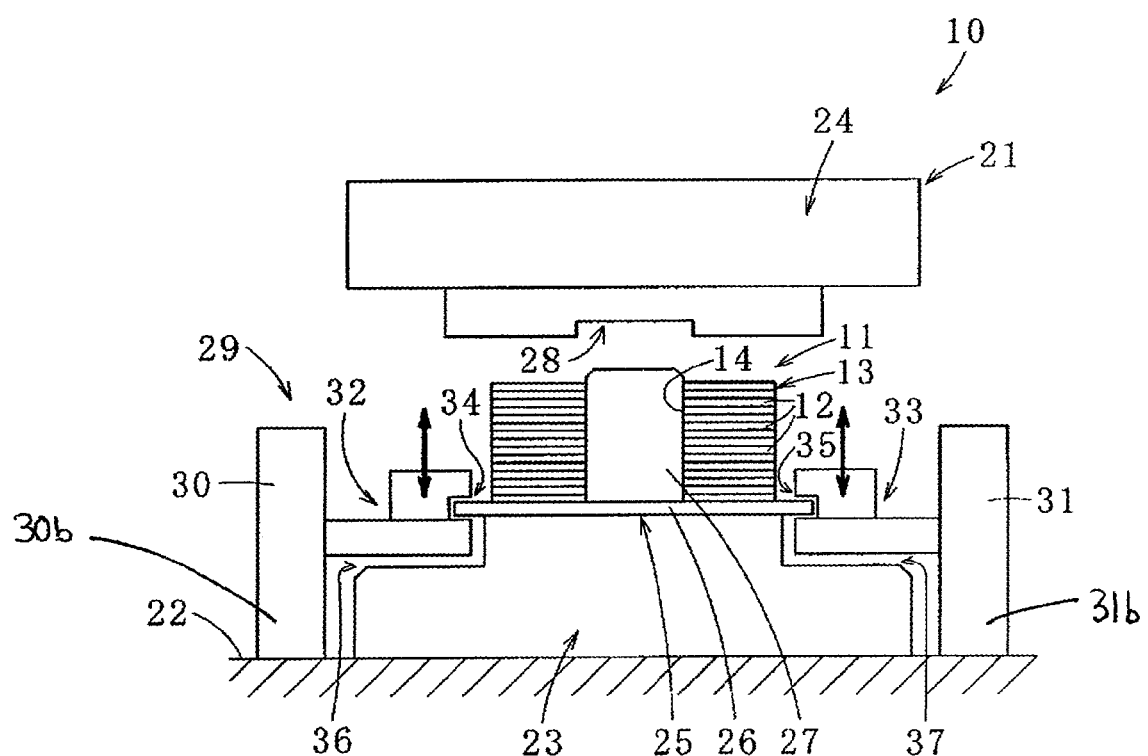
FIG. 1 is a front view of an apparatus for manufacturing a laminated iron core according to one embodiment of the present invention.
Figure 2:
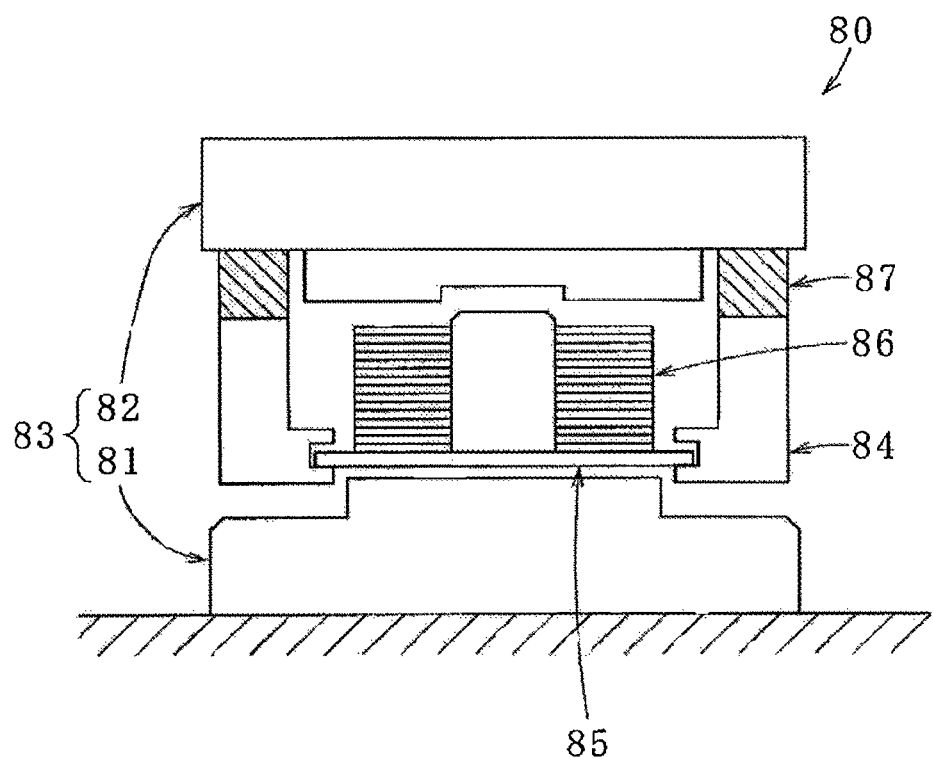
FIG. 2 is a front view of an apparatus for manufacturing a laminated iron core according to a related art.

First, a laminated iron core 11 manufactured using an apparatus 10 for manufacturing the laminated iron core according to one embodiment of the present invention will be described with reference to FIG. 1.

The laminated iron core 11 is a rotor iron core (rotor).

This laminated iron core 11 has a laminated iron core body 13 constructed by laminating a plurality of annular (or predetermined shaped) iron core pieces 12. In addition, the laminated iron core body 13 can be constructed by sequentially rotating and laminating plural block iron cores formed by laminating the plural annular iron core pieces 12.

This iron core piece 12 has an annular integral structure. In addition, the iron core piece may have a divided structure capable of annularly joining plural circularly arcuate iron core piece parts, or a structure capable of connecting a part of the plural circularly arcuate iron core piece parts in a circumferential direction by a joining part and folding this joining part to be formed in an annular shape.

The iron core piece 12 is punched and formed from a thin plate workpiece (thin metal sheet) made of, for example, an amorphous material or an electromagnetic steel plate with a thickness of about 0.10 to 0.5 mm. In addition, the iron core piece may be a piece punched from one thin plate material, or a piece punched from plural (for example, two, or three or more) stacked thin plate materials.

The iron core pieces 12, 12 adjacent in a lamination direction are mutually joined by caulking bonding, but can further be joined using any one or two or more of a resin (a thermosetting resin (for example, an epoxy resin) or a thermoplastic resin), an adhesive and welding. In addition, in the case of using the resin, a joining hole (one example of a through hole) is formed in the lamination direction of the laminated iron core body and the resin is injected into this joining hole.

Figure 3:
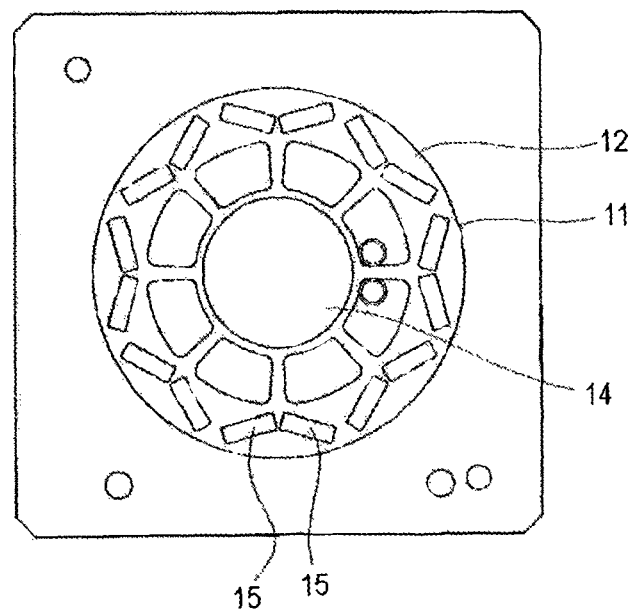
FIG. 3 is a plan view of laminated iron core.

As shown in FIG. 3, the center of the laminated iron core 11 is formed with a shaft hole 14, and plural magnet-insert holes 15 (one example of a through hole) formed in the lamination direction of the laminated iron core 11 (laminated iron core body 13) are formed in the periphery around this shaft hole 14. A permanent magnet 16 is fixed to this magnet-insert hole 15 using the resin 17 described above.

In addition, the laminated iron core 11 can further be formed with plural weight reduction holes (not shown) pierced in the lamination direction in the periphery of the laminated iron core 11 around the shaft hole 14.

Also, the laminated iron core may be a stator iron core (stator).

This laminated iron core has a laminated iron core body constructed by laminating a plurality of annular iron core pieces punched from the thin plate workpiece described above, and has an annular yoke part, and plural magnetic pole parts connected integrally to an inner peripheral side of this yoke part.

In addition, the iron core pieces adjacent in the lamination direction are mutually joined by the resin described above, but can further be joined using any one or two or more of caulking, an adhesive and welding. This joining by the resin can be implemented by a structure similar to the joining hole of the laminated iron core 11 described above.

Subsequently, the apparatus (hereinafter simply also called a manufacturing apparatus) 10 for manufacturing the laminated iron core according to one embodiment of the present invention will be described with reference to FIG. 1.

The apparatus 10 for manufacturing the laminated iron core includes a die unit 21 for holding the laminated iron core body 13 and a injector (not shown) which injects a resin into a magnet-insert hole (further, a joining hole) formed in the lamination direction of the laminated iron core body 13 held by this die unit 21 and fixes a permanent magnet to the magnet-insert hole.

The die unit 21 has a lower die 23 arranged on a base table 22 of the manufacturing apparatus 10, and an upper die 24 upwardly and downwardly movable with respect to this lower die 23.

The lower die 23 and the upper die 24 clamp the laminated iron core body 13 by holding the laminated iron core body 13 between the lower die 23 and the upper die 24 on both sides in the lamination direction with the laminated iron core body 13 is placed on a conveyance jig 25.

In addition, the lower die 23 is formed with plural resin pool pots (not shown) with circular cross sections or injectors, and is configured to extrude a resin of the inside of this resin pool pot toward the laminated iron core body 13 by a plunger.

The conveyance jig 25 includes a placement table 26 on which the laminated iron core body 13 is placed, and a positioning rod 27 erected on the center of this placement table 26.

The placement table 26 has a square shape (one example of a quadrilateral shape) in plan view, and the back side of the placement table 26 is formed with plural groove parts (not shown), and the end of each of the groove parts is formed with a gate (not shown) communicating with the magnet-insert hole. Accordingly, the resin extruded from the resin pool pot of the lower die 23 is injected into the magnet-insert hole of the laminated iron core body 13 through the groove part and the gate of the placement table 26. In addition, in use, a lower surface of the placement table 26 abuts on an upper surface of the lower die 23 and thereby, the groove part is closed to form a resin flow path (runner).

The positioning rod 27 functions for positioning the laminated iron core body 13 placed on the placement table 26 by being fitted into the shaft hole 14 of the laminated iron core body 13.

This positioning rod 27 becomes higher than a lamination height of the laminated iron core body 13 (the distal end of the positioning rod 27 is projected from an upper surface of the laminated iron core body 13). In addition, in use, the distal end of the positioning rod 27 is inserted into a relief hole 28 formed in a lower part of the upper die 24.

Accordingly, the resin can be injected into the magnet-insert hole of the laminated iron core body 13 held by the die unit 21 from the lower die 23 through the conveyance jig 25 (placement table 26).

The base table 22 is provided with an upward and downward movement unit 29 capable of upwardly and downwardly moving the conveyance jig 25 with respect to the lower die 23.

The upward and downward movement unit 29 includes guide posts 30, 31 erected on both lateral sides of the lower die 23, a pair of support parts 32, 33 upwardly and downwardly movably formed along the guide posts 30, 31, and a servomotor (driving source) (not shown) for upwardly and downwardly moving the support parts 32, 33 along the guide posts 30, 31. That is, the guide posts 30, 31 and the support parts 32, 33 of the upward and downward movement unit 29 are formed in a position different from that of the die unit 21 (or provided independently from the die unit 21), and the support parts 32, 33 can be upwardly and downwardly moved independently of the upper die 24. In other words, the upward and downward movement unit 29 is a lift that is capable of selectively moving the conveyance jig 25 upwardly and downwardly with respect to and separately from the lower die 23. The upward and downward movement unit 29 (i.e., lift) is mounted so as to be unaffixed to both the die unit 21 and the conveyance jig 25. Further, the upward and downward movement unit 29 (i.e., lift) may be mounted so that a base 30b, 31b of the upward and downward movement unit 29 (i.e., lift) is spaced apart from both the upper die 21 and lower die 23. See FIG. 1.

The pair of support parts 32, 33 is respectively provided with guide grooves 34, 35 which support the conveyance jig 25 (placement table 26) from both sides in a width direction and arrange this conveyance jig 25 between the lower die 23 and the upper die 24.

Each of the guide grooves 34, 35 has a U shape in side view and has a structure capable of sliding and attaching the placement table 26 of the conveyance jig 25 so as to hold the placement table 26 from both sides in the width direction. Accordingly, the placement table 26 can be arranged between the lower die 23 and the upper die 24 by moving the placement table 26 while being guided in a horizontal direction.

In addition, both ends of the upper side of the lower die 23 are provided with notches 36, 37 and thereby, it is constructed so that the support parts 32, 33 do not make contact with the lower die 23 in the case of downwardly moving the support parts 32, 33.

The pair of support parts 32, 33 is upwardly and downwardly moved in synchronization by the servomotor by instructions from a controller (not shown).

Here, the controller controls and cooperates upward and downward operations of the support parts 32, 33 with upward and downward operations of the upper die 24. Concretely, based on a previously inputted program, the support parts 32, 33 are downwardly moved in cooperation with downward movement of the upper die 24 and also, the support parts 32, 33 are upwardly moved in cooperation with upward movement of the upper die 24.

Subsequently, a method for manufacturing the laminated iron core 11 using the apparatus 10 for manufacturing the laminated iron core described above will be described with reference to FIG. 1.

The laminated iron core body 13 formed by laminating the plurality of iron core pieces 12 is manufactured, and this laminated iron core body 13 is placed on the conveyance jig 25. At this time, the positioning rod 27 of the conveyance jig 25 is fitted into the shaft hole 14 of the laminated iron core body 13, and laminated iron core body 13 is attached in a predetermined position of the placement table 26 of the conveyance jig 25.

In addition, the conveyance jig 25 may be arranged in a die apparatus for manufacturing the laminated iron core body 13 to sequentially laminate the iron core pieces 12 inside the die apparatus.

Next, a permanent magnet (unmagnetization) is inserted into each of the magnet-insert holes of the laminated iron core body 13. In this case, the permanent magnet may be inserted with the laminated iron core body 13 inclined laterally.

Then, the conveyance jig 25 is horizontally moved with the laminated iron core body 13 placed on the conveyance jig 25, and is attached to the support parts 32, 33 of the upward and downward movement unit 29. In this state, space (gap) is present between a lower surface of the conveyance jig 25 and an upper surface of the lower die 23.

In addition, a resin pool pot of the lower die 23 is previously filled with a tablet of a resin.

By the upward and downward movement unit 29, the conveyance jig 25 is downwardly moved. At this time, the upper die 24 is also downwardly moved.

Then, the lower surface of the conveyance jig 25 abuts on the upper surface of the lower die 23 and thereafter, a lower surface of the upper die 24 abuts on an upper surface of the laminated iron core body 13 and thereby, the laminated iron core body 13 is clamped by the lower die 23 and the upper die 24.

Accordingly, an upper part of the magnet-insert hole is closed by the upper die 24 and further, the distal end of the positioning rod 27 is inserted into the relief hole 28.

Figure 4:
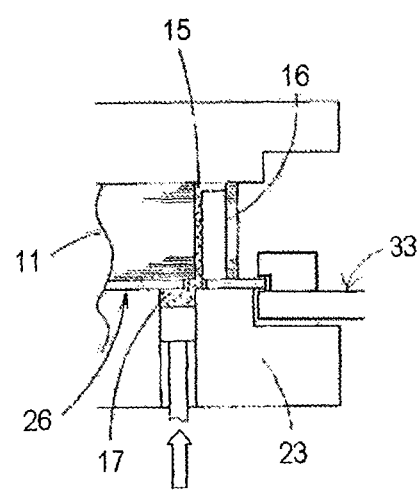
FIG. 4 is a diagram for explaining a step in manufacturing a laminated iron core.

In this state, the melted resin 17 heated inside the resin pool pot is extruded by upwardly moving a plunger, and the magnet-insert hole 15 is filled with the resin from a resin flow path through a gate, as shown in FIG. 4.

After the resin is cured, the conveyance jig 25 and the upper die 24 are upwardly moved. In addition, until the conveyance jig 25 reaches an initial height position, the conveyance jig 25 and the upper die 24 could be upwardly moved in synchronization to then upwardly move only the upper die 24, but the conveyance jig 25 may be upwardly moved after the upper die 24 is upwardly moved.

Accordingly, the cured resin remaining in the resin pool pot and the cured resin remaining in the resin flow path are pulled up in a state adhering to the conveyance jig 25 (placement table 26) together with the conveyance jig 25 and the laminated iron core body 13 in which the permanent magnet is sealed with the resin.

Thereafter, the laminated iron core 11 can be obtained by detaching the laminated iron core body 13 from the conveyance jig 25.

Consequently, by using the apparatus for manufacturing the laminated iron core according to one embodiment of the present invention, resin injection can be implemented by the common die unit even for the laminated iron core bodies with different lamination heights. As a result, it becomes unnecessary to do work of replacing a spacer, and also to make the spacer with respect to each of the laminated iron core bodies with different lamination heights like the case of the related art.

Also, even in an insufficient cooling state of the die unit for production of the laminated iron core, it becomes unnecessary for a worker to put a hand in the apparatus and replace the spacer like the case of the related art, with the result that safety can be improved.

Further, the upward and downward movement unit is formed in a position different from that of the die unit or independently from the die unit, with the result that the die unit can be formed in a simple and small shape, and the cost of the die unit can be reduced.

The present invention has been described above with reference to the embodiment, but the present invention is not limited to the configuration described in the embodiment described above, and also includes other embodiments and modified examples contemplated within the scope of the matter described in the claims. For example, the case of constructing the apparatus for manufacturing the laminated iron core of the present invention by combining a part or all of the respective embodiments and modified examples described above is also included in the scope of right of the present invention.

The embodiment described above describes the case of forming the conveyance jig (placement table) in the square shape in plan view, but is not limited to this case. As long as there is no trouble with conveyance or positioning, shapes other than the square shape, for example, a polygonal shape or a circular shape may be used, and can be selected properly.

Also, the embodiment described above describes the case of injecting the resin into the through hole (the magnet-insert hole or the joining hole) formed in the lamination direction of the laminated iron core body from the lower die through the conveyance jig (the apparatus and method for manufacturing the laminated iron core), but the resin may be injected from the upper die. In this case, the upper die is formed with plural resin pool pots with circular cross sections.

In that case, the resin may be directly injected into the through hole from the upper die and also, the resin may be injected into the through hole from the upper die through a dummy plate formed between the laminated iron core body and the upper die.

In addition, the dummy plate can have a configuration substantially similar to that the placement table of the conveyance jig described above. Concretely, a front side (side of the upper die) of the dummy plate is formed with plural groove parts, and the end of each of the groove parts is formed with a gate communicating with the through hole. In use, a lower surface of the upper die abuts on an upper surface of the dummy plate and thereby, the groove part is closed to form a resin flow path (runner).

REFERENCES SIGNS LIST

10: APPARATUS FOR MANUFACTURING LAMINATED IRON CORE
11: LAMINATED IRON CORE
12: IRON CORE PIECE
13: LAMINATED IRON CORE BODY
14: SHAFT HOLE
21: DIE UNIT
22: BASE TABLE
23: LOWER DIE
24: UPPER DIE
25: CONVEYANCE JIG
26: PLACEMENT TABLE
27: POSITIONING ROD
28: RELIEF HOLE
29: UPWARD AND DOWNWARD MOVEMENT MEANS
30, 31: GUIDE POST
32, 33: SUPPORT PART
34, 35: GUIDE GROOVE
36, 37: NOTCH

What is claimed is:

1. A method for manufacturing a laminated iron core, the method comprising:
    placing a laminated iron core body on a conveyance jig, wherein the laminated iron core body is lamination of a plurality of iron core pieces;
    downwardly moving the conveyance jig by a lift and downwardly moving an upper die of a die unit with respect to a lower die of the die unit, wherein the lift is mounted so as to be unaffixed to both the die unit and the conveyance jig;
    holding the laminated iron core body placed on the conveyance jig from both sides in a lamination direction of the plurality of iron core pieces between the lower die and the upper die, wherein the lower die comes into contact with the conveyance jig; and
    injecting a resin into a through hole formed through the laminated iron core body held by the die unit in the lamination direction of the plurality of iron core pieces from the lower die through the conveyance jig or from the upper die.

2. The method for manufacturing the laminated iron core according to claim 1, wherein the through hole is a magnet-insert hole, and
    the resin is injected into the magnet-insert hole to thereby fix a permanent magnet to the magnet-insert hole.

3. The method for manufacturing the laminated iron core according to claim 1, wherein the lift is mounted so that a base of the lift is spaced apart from both the upper die and lower die.

4. The method for manufacturing the laminated iron core according to claim 1, wherein the conveyance jig has a quadrilateral shape in plan view, and
    the method further comprises supporting the conveyance jig by a pair of support parts of the lift from both sides in a width direction, each of the support parts being provided with a guide groove in which the conveyance jig is slidably attached to be horizontally moved and arranged between the lower die and the upper die.

5. The method for manufacturing the laminated iron core according to claim 4, wherein the support parts are moved upwardly and downwardly along a pair of guide posts of the lift.

6. The method for manufacturing the laminated iron core according to claim 1, further comprising:
    controlling the upper die and the lift to cooperate an operation of the lift with an operation of the upper die.

* * * * *